United States Patent [19]

Ikuta et al.

[11] Patent Number: 5,461,584
[45] Date of Patent: Oct. 24, 1995

[54] SEMICONDUCTOR SENSOR DEVICE

[75] Inventors: Toshio Ikuta, Handa; Tadashi Shibata, Toyokawa, both of Japan

[73] Assignee: Nippondenso Co., Ltd., Kariya, Japan

[21] Appl. No.: 87,373

[22] Filed: Jul. 8, 1993

[30] Foreign Application Priority Data

Jul. 9, 1992 [JP] Japan .................... 4-206071

[51] Int. Cl.$^6$ .................................. G11C 7/00
[52] U.S. Cl. ................ 305/189.01; 365/189.12; 365/94; 365/96
[58] Field of Search ............ 365/189.01, 189.12, 365/196, 211, 94, 96, 225.7

[56] References Cited

U.S. PATENT DOCUMENTS

| | | | |
|---|---|---|---|
| 4,272,753 | 6/1981 | Nicolay | 337/297 |
| 4,588,880 | 5/1986 | Hesser | 235/376 |
| 5,080,096 | 1/1992 | Hooper et al. | 607/30 |
| 5,081,867 | 1/1992 | Yamada | 73/517 R |

FOREIGN PATENT DOCUMENTS

| | | |
|---|---|---|
| 245031 | 11/1987 | European Pat. Off. . |
| 48-97054 | 12/1973 | Japan . |
| 50-15452 | 2/1975 | Japan . |
| 53-99784 | 8/1978 | Japan . |
| 59-28986 | 7/1984 | Japan . |
| 60-247179 | 12/1985 | Japan . |
| 315345 | 2/1991 | Japan . |
| 4043425 | 7/1992 | Japan . |

OTHER PUBLICATIONS

Monolithic Memories "IMOX Product Product Technology and Reliability" May 14, 1989, pp. 3-141.

*Primary Examiner*—David C. Nelms
*Assistant Examiner*—Huan Hoang
*Attorney, Agent, or Firm*—Cushman, Darby & Cushman

[57] ABSTRACT

A semiconductor sensor device which has a decreased number of terminals, which is cheaply and compactly constructed and which contains a trimming circuit. A power source voltage and a clock signal having a voltage level greater than the power source voltage are input to a terminal 31. A logic circuit 22 starts operating at one voltage level of a terminal 33 and temporarily stores serial digital signals that are input through a terminal 32 in response to clock signals as parallel trimming data. A gauge circuit 11 operates based on the stored trimming data, and the gauge output is sent to the terminal 32. With another voltage level from the terminal 33, the logic circuit 22 trims a fuse memory circuit 23 based on the stored trimming data. At a further voltage level from the terminal 33, the gauge circuit 11 is operated based on the data in the fuse memory circuit 23 that is trimmed, and an output signal thereof is sent to the terminal 32.

12 Claims, 6 Drawing Sheets

SEMICONDUCTOR SENSOR DEVICE

BACKGROUND OF THE INVENTION

1. Field of the Invention

The present invention relates to a semiconductor sensor device and, particularly, to a semiconductor sensor device which is realized in the form of a compact chip capable of being electrically trimmed.

2. Description of the Related Art

In a semiconductor pressure sensor and the like, a resistance film is trimmed to a predetermined shape by laser trimming at the time of fabricating the chip in order that the resistance film will roughly acquire a predetermined resistance.

Then, after the sensor chip is mounted in a housing, in many cases, a final trimming adjustment is effected while applying pressure. In the case of a pressure sensor for high-pressure applications, however, it is difficult to effect the laser trimming since the semiconductor chip is hermetically sealed in the housing, and it becomes necessary to effect the trimming electrically.

The electrical trimming is usually carried out by using a fuse memory or an EPROM. However, this requires a number of control terminals (pins) for writing and reading trimming data. Even when the trimming circuit is formed in the same chip as the sensor circuit, the production cost is not decreased but is rather increased due to an increase in the number of pins needed for the chip.

In a pressure sensor for high-pressure applications as shown in FIG. 5, in particular, a sensor chip is disposed in a space 4a at the end of a lower half 41 of the housing, the housing being threaded along its outer circumference 44 for mounting, and lead pins 43 are provided from the terminals of the sensor chip to a space 4b at the upper end of the housing running through an intermediate portion 42 of the housing which has a large thickness to withstand pressure. However, the lead pins which are provided with hermetic sealing 45 are very expensive to produce. This is because the holes through which the lead pins 43 run must be made as small as possible in order to decrease the areas that receive high pressures. This, however, requires a greatly increased period of time for machining and causes the yield to be decreased.

When a pressure sensor having many pins is being used (as a sensor), furthermore, the pins that were provided for trimming and that are now not necessary remain open and are buried in the casing or the housing. However, high-frequency noise (EMI noise) can infiltrate into the sensor circuit through such unnecessary pins and deteriorate the S/N ratio. Moreover, a number of connections such as wire bonds provided between the pins and the sensor chip are detrimental to maintaining reliability.

SUMMARY OF THE INVENTION

The present invention is directed to solving the above-mentioned problems, and its object is to provide a semiconductor sensor device which can be cheaply constructed, and is compact in size yet still contains a trimming circuit.

That is, the present invention provides a semiconductor sensor device comprising a semiconductor sensor contained in a chip; a first terminal which inputs into the chip an operation voltage for the semiconductor sensor; a second terminal which outputs out of the chip a sensor signal from the semiconductor sensor; a third terminal which introduces into the chip external voltages of a plurality of levels which are different from each other and are greater than that of the operation voltage; an auxiliary memory means which starts operating at a voltage level from any one of the three terminals and temporarily stores serial digital signals as parallel trimming data input through any one of the three terminals; an auxiliary measuring means which operates the semiconductor sensor at one voltage level based on the trimming data stored in the auxiliary memory means and outputs the sensor signal to the second terminal; a trimming means which trims a main memory means with one voltage level of the third terminal based on the trimming data stored in the auxiliary memory means; and a main measuring means which operates the semiconductor sensor at another voltage level of the third terminal based on the data stored in the main memory means that is trimmed and outputs the sensor signal to the second terminal.

Described in further detail with reference to FIG. 1, a semiconductor sensor device 100 according to the present invention comprises a semiconductor sensor 9 contained in a chip; a first terminal 1 which inputs into the chip an operation voltage for the semiconductor sensor 9; a second terminal 2 which outputs out of the chip a sensor signal of the semiconductor sensor 9; a third terminal 3 which introduces into the chip external voltages of a plurality of levels which are different from each other and are greater than the operation voltage; an auxiliary memory means 6 which starts operating at a voltage level from any one of the three terminals 1, 2, 3 and temporarily stores serial digital signals input through any one of the three terminals 1, 2, 3 as parallel trimming data; an auxiliary measuring means 7 which operates the semiconductor sensor 9 at the one voltage level based on the trimming data stored in the auxiliary memory means 6 and outputs the sensor signal to the second terminal 2; a trimming means 5 which trims a main memory means 8 at one voltage level of the third terminal 3 based on the trimming data stored in the auxiliary memory means 6; and a main measuring means 4 which operates the semiconductor sensor 9 at another voltage level of the third terminal based on the data stored in the main memory means 8 that is trimmed and outputs the sensor signal to the second terminal 2.

According to the above-mentioned constitution, the semiconductor sensor is electrically trimmed with signals that are input and output via three terminals provided for the chip, and is thus realized cheaply and in a compact size.

DESCRIPTION OF THE PREFERRED EMBODIMENTS

Embodiments of the semiconductor sensor device according to the present invention will now be described in detail in conjunction with the drawings.

Figure 2:
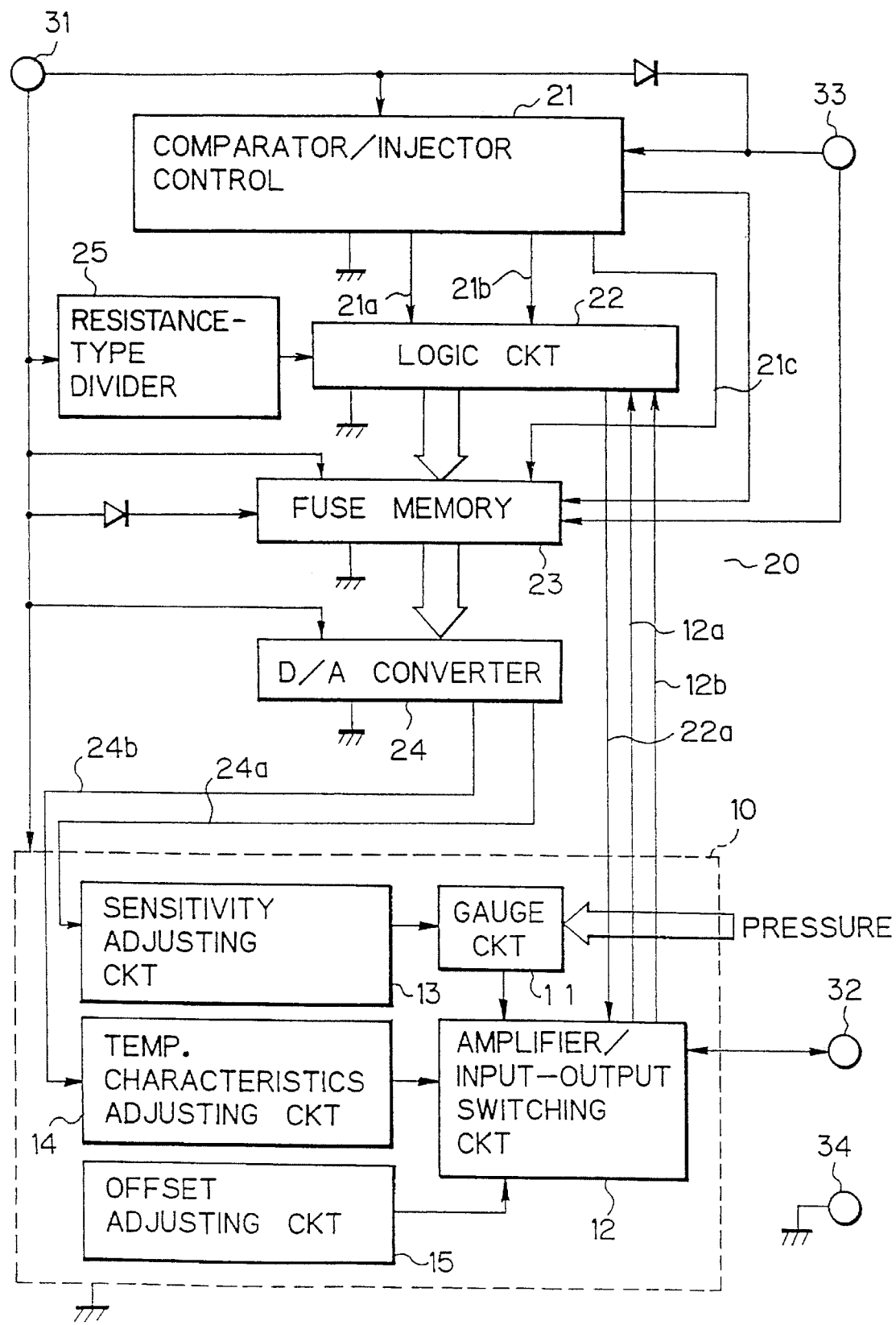
FIG. 2 is a block diagram illustrating the whole constitution of a semiconductor sensor device formed on a chip.

FIG. 2 is a block diagram illustrating the whole constitution of an embodiment of a semiconductor pressure sensor according to the present invention formed on a chip. In FIG. 2, a portion surrounded by a broken line is an analog circuit portion 10 which handles analog signals, and other portions pertain to a digital circuit portion 20 that handles digital signals.

A gauge circuit 11 in the analog circuit portion 10 is constituted by a semiconductor distortion gauge which produces an output signal depending upon the pressure that is applied, and the output signal is input to an amplifier/input-output switching circuit 12 and is amplified. This amplifier/input-output switching circuit 12 is connected to a terminal 32 that corresponds to the second terminal 2 which is provided for the chip.

The analog circuit portion 10 is further provided with a sensitivity adjusting circuit 13, a temperature characteristics adjusting circuit 14 and an offset adjusting circuit 15. The sensitivity adjusting circuit 13 changes and adjusts the voltage applied to the gauge circuit 11 depending upon the output of the D/A converter 24 provided in the digital circuit portion 20, and the temperature characteristics adjusting circuit 14 changes and adjusts the reference voltage for temperature characteristics of the amplifier unit in the amplifier/input-output switching circuit 12 depending on the output of the D/A converter 24.

A comparator/injector control circuit 21 in the digital circuit portion 20 is connected to a terminal 31 that corresponds to the aforementioned first terminal 1 and to a terminal 33 that corresponds to the third terminal 3. When a voltage (12V) input through the terminal 33 is greater than a power source voltage (5V) input through the terminal 31, a constant-current source starts operating due to the output of the comparator that is contained therein, and an operation current 21a is fed to a logic circuit 22. At the same time, a reset output 21b is generated to reset a shift register contained in the logic circuit 22, and a mode signal 22a of the level "0" is output to the amplifier/input-output switching circuit 12.

Upon receipt of the mode signal 22a, the switching unit in the amplifier/input-output switching circuit 12 is switched to the input side and the data can be output to the logic circuit 22 via the terminal 32 and signal line 12a. A clock pulse of a voltage (8V) higher than the power source voltage that is input through the terminal 31 under this condition, is voltage divided through a resistance-type voltage divider 25 and is fed to the shift register in the logic circuit 22, whereby the serial digital data input through the terminal 32 are successively stored in the shift register and are converted into parallel trimming data.

Here, if the head bit of the serial digital data is used as a mode judging bit and if "1" is assigned to it, then the mode signal 22a output from the logic circuit 22 is inverted to the level "1" once data is stored in the shift register is fed the trimming data, and the switching unit in the amplifier/input-output switching circuit 12 is switched to the output side.

The trimming data are input to the fuse memory circuit 23, as well as to the D/A converter 24, and its analog output signals 24a and 24b are used as a voltage for the sensitivity adjusting circuit 13 and as a reference voltage for the temperature characteristics adjusting circuit 14. With the application of the above voltage and reference voltage, the output voltage of the gauge circuit 11 is obtained through the terminal 32 via the amplifier/input-output switching circuit 12. In the present invention, a conventional fuse memory such as an EPROM is used as the fuse memory circuit 23. Each of the fuses of the EPROM are conventionally made of a thin film resistor and each fuse is selectively melted or not melted, so as to set an output level of respective output lines to a "high" or "low" level. When trimming data is to be written into the fuse memory circuit, a high level voltage (i.e. 36 volts at terminal 33) is applied to each one of the fuses which are desired to be cut while a trim enable signal (i.e. 7.5 volts at terminal 32) is active. After the fuse memory circuit is trimmed, i.e. programmed, data stored therein is read out under the control of the comparator/injector control 21.

Figure 1:
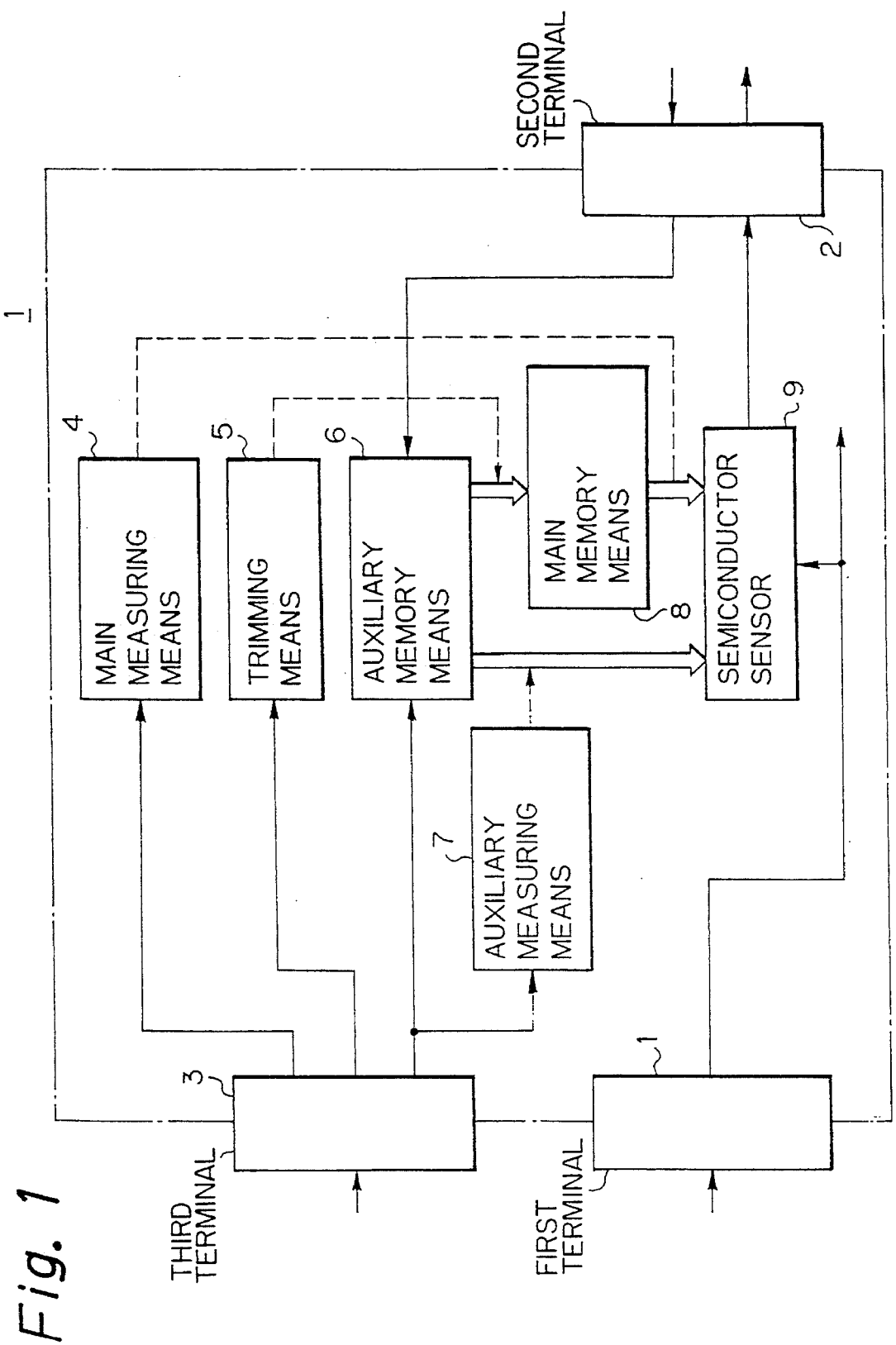
FIG. 1 is a block diagram illustrating the constitution of a semiconductor sensor device according to the present invention.

The relationship between each of the elements shown in FIG. 1 and each of the elements shown in FIG. 2, is explained hereinunder. The comparator/injector control circuit 21 disclosed in FIG. 2 corresponds to the main measuring means 4 disclosed in FIG. 1. On the other hand, the logic circuit 22 disclosed in FIG. 2 corresponds to the circuitry comprising the auxiliary memory circuit 6, the auxiliary measuring means 7 and the trimming means 5, each being disclosed in FIG. 1. Further, the fuse memory circuit 23 corresponds to the main memory means 8 disclosed in FIG. 1.

Figure 3:
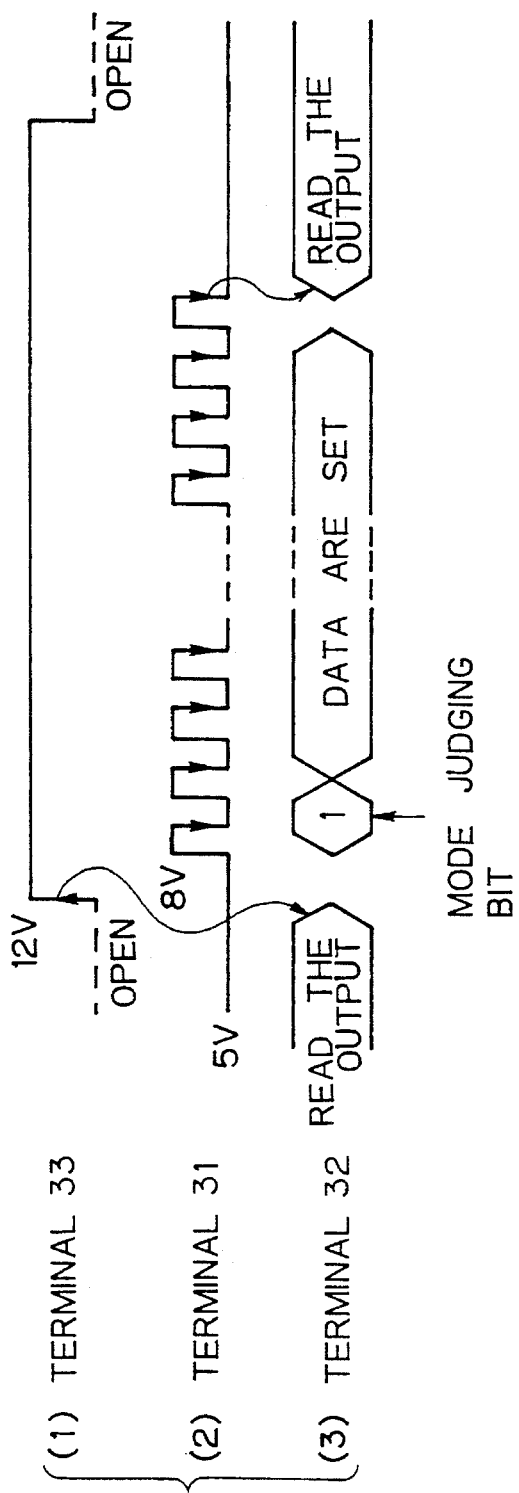
FIG. 3 is a diagram of signal waveforms at the terminals of the semiconductor sensor device of the present invention.

The signal waveforms at the terminals at this moment are shown in FIG. 3. The voltage at the terminal 33 in the open state is set to 12V, and the trimming data are sent to the logic circuit 22 via the terminal 32 in response to the clock pulse input from the terminal 31. The gauge output is obtained at the terminal 32 from the above trimming data. The above-mentioned procedure is repeated while the trimming data are gradually changed, and the trimming data are fixed when a desired gauge output is obtained.

Figure 4:
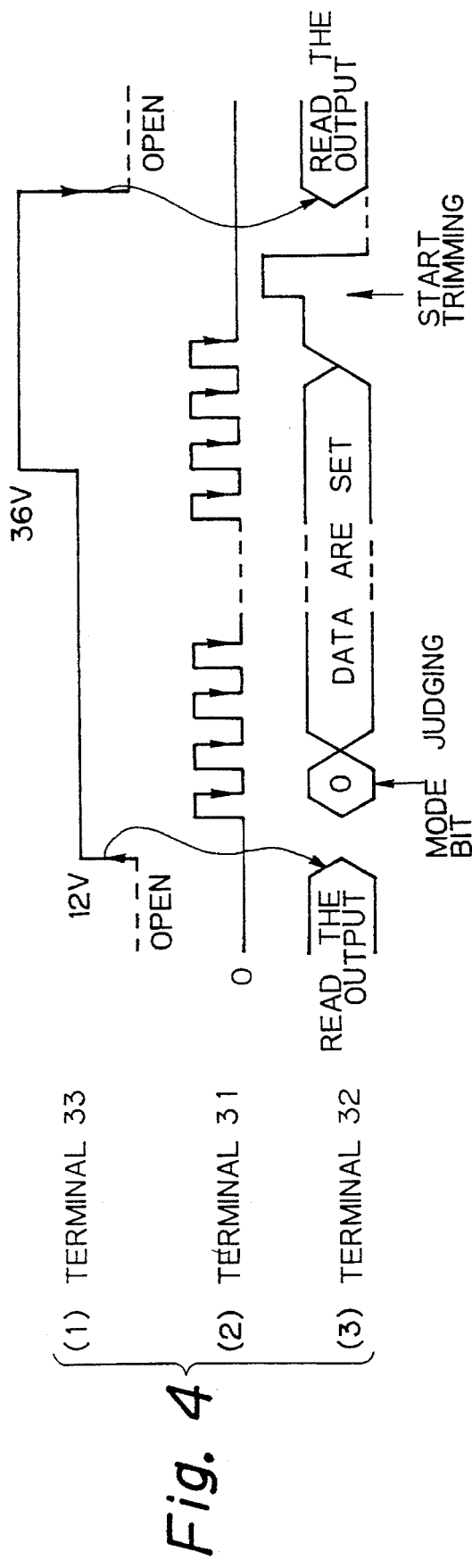
FIG. 4 is a diagram of signal waveforms at the terminals of the semiconductor sensor device of the present invention.
Figure 5:
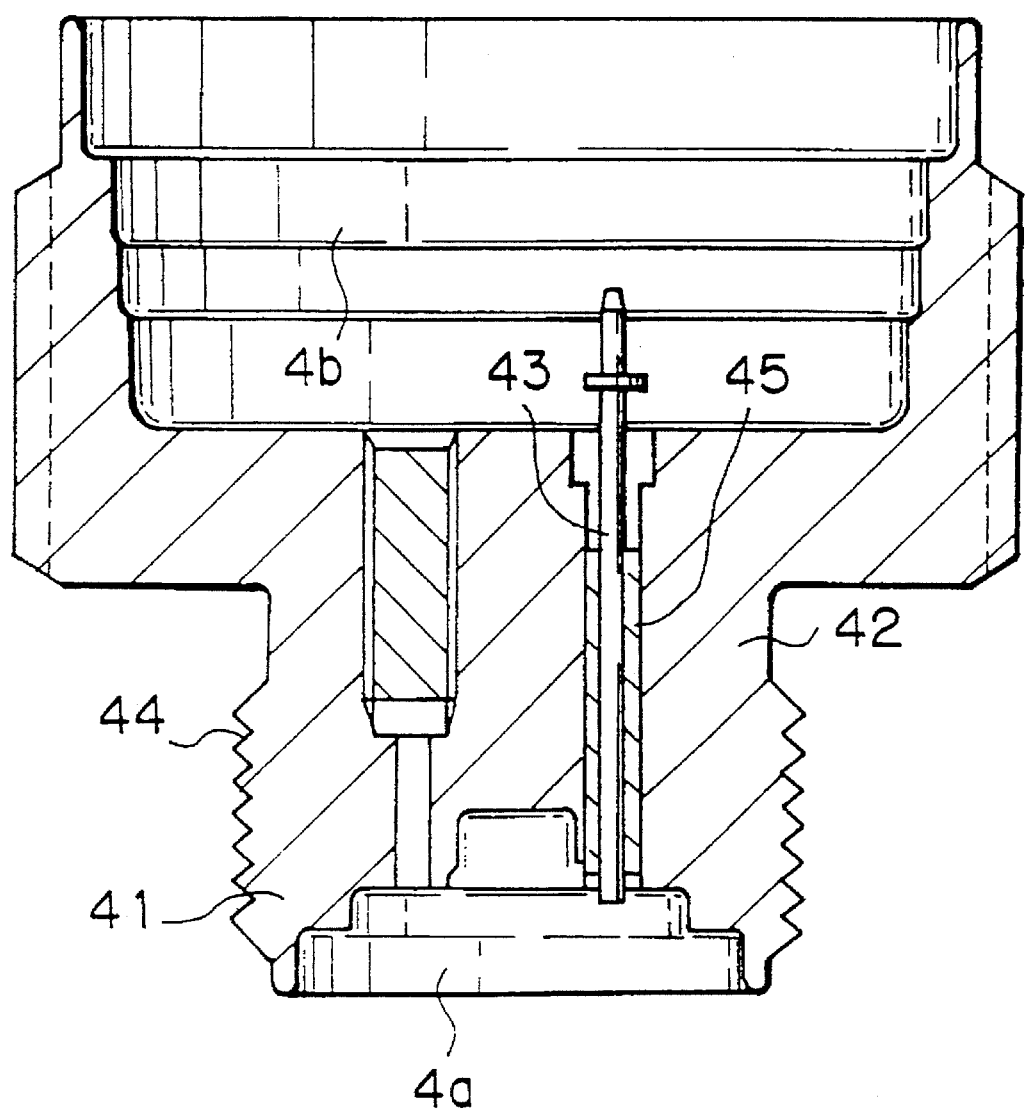
FIG. 5 is a sectional view of the housing of a prior art semiconductor pressure sensor.

After the final trimming data are determined, the voltage at the terminal 33 is raised to 12V as shown in FIG. 4 to operate the logic circuit 22 and other circuits. The mode judging bit at the head is then set to the level "0", and the serial digital signals which are the same as the above fixed trimming data are input and sent to the shift register in the logic circuit 22 via the terminal 32 in response to the clock pulses. During this period, the voltage at the terminal 33 is raised to 36V which is necessary for trimming i.e., for cutting the fuses of the fuse memory circuit 23, by a melting operation caused by the 36v level.

The mode signal output from the logic circuit 22 remains at the level "0", and the switching unit in the amplifier/input-output switching circuit 12 is maintained on the input side. Under this condition, if a trim start signal is input which is in excess of a predetermined threshold voltage (7.5V) through the terminal 32, a trim enable signal is sent to the logic circuit 22 from the amplifier/input-output switching circuit 12, and the fuse memory circuit 23 is trimmed, i.e. the electrically programmed, programmable memory of the fuse memory circuit 23 is in accordance with the trimming data.

Then, when the terminal 33 is opened, the logic circuit 22 stops operating. Here, however, the mode signal 22a that is pulled up assumes the level "1", and the switching unit in the amplifier/input-output switching circuit 12 is switched to the output side. At the same time, a read signal 21c is output to the fuse memory circuit 23 from the comparator/injector control circuit 21, and the fused memory data that is stored in the fuse memory circuit 23 are output to the D/A converter 24.

Thereafter, the sensitivity adjusting circuit 13 and the temperature characteristics adjusting circuit 14 operate with the application of the voltage and the reference voltage obtained relying upon the correctly trimmed memory data fused into the fuse memory circuit 23, and through the terminal 32 a gauge output is obtained that corresponds to the applied pressure with no error.

Here, the terminal 34 is a ground terminal which may be omitted depending upon the applications.

Moreover, though a clock pulse was superimposed on the power source terminal 31, it is also allowable to superimposed any other serial digital signals.

Any other different voltage may be employed instead of the open potential at the terminal 33.

The constitution of the semiconductor sensor device according to the first embodiment of the present invention is summarized below.

That is, a semiconductor sensor device comprising a semiconductor sensor contained in a chip, a first terminal which inputs into the chip an operation voltage for said semiconductor sensor or serial digital signals greater than the operation voltage, a second terminal which outputs the sensor signal of said semiconductor sensor out of the chip or inputs the serial digital signals into the chip, a third terminal which introduces into the chip the external voltages of at least three kinds of voltage levels, an auxiliary memory means which starts operating with one of the voltage levels of the third terminal and temporarily stores serial digital signals serially input through any one of the other remaining terminals as parallel trimming data, an auxiliary measuring means which operates the semiconductor sensor with one voltage level based on the trimming data stored in the auxiliary memory means and outputs the sensor signal to the second terminal, a trimming means which blows fuses of a main memory means with another voltage level of the third terminal based on the trimming data stored in the auxiliary memory means, and a main measuring means which operates the semiconductor sensor with a further voltage level of the third terminal based on the data stored in the main memory means and outputs the sensor signal to the second terminal.

Figure 6:
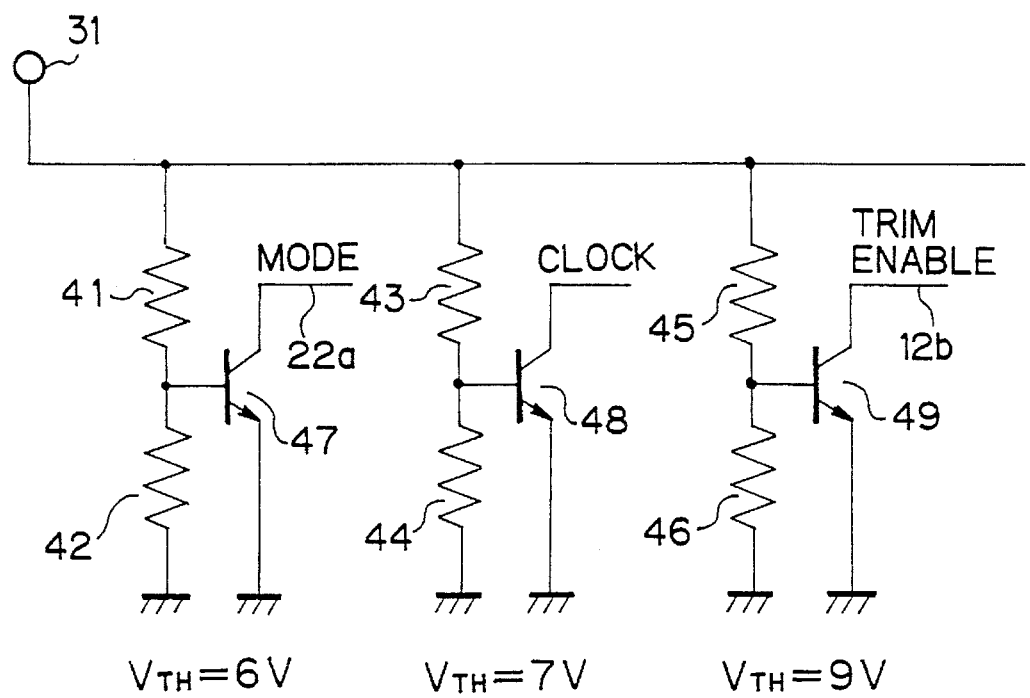
FIG. 6 is a circuit diagram according to another embodiment of the present invention.

Described below is a semiconductor sensor device according to a second embodiment of the present invention. In the above-mentioned embodiment, the mode signal 22a and the trim enable signal 12b are input through the gauge output terminal 32. As shown in FIG. 6, however, these signals 22a and 12b may be input through the power source terminal 31 together with clock pulses. That is, three kinds of voltage-dividing resistors 41, 42, 43, 44, 45, 46 having different resistance ratios are connected in parallel to the power source line, and a signal of the 0-level mode, a clock pulse signal and a trim enable signal are output from the transistors 47, 48, 49 that receive outputs from the voltage-dividing resistors 41 to 46.

The transistors 47 to 49 have threshold voltages VTH of 6V, 7V and 9V. The mode signal 22a is generated when the power source voltage is greater than 6V, whereby the write mode is assumed, and the trimming data are input through the terminal 32 (FIG. 2) in synchronism with clock pulse signals that move up and down with 7V as a boundary. After the trimming data are input, the power source voltage is set to be greater than 9V, whereby the trim enable signal 12b is generated to effect the trimming.

Figure 7:
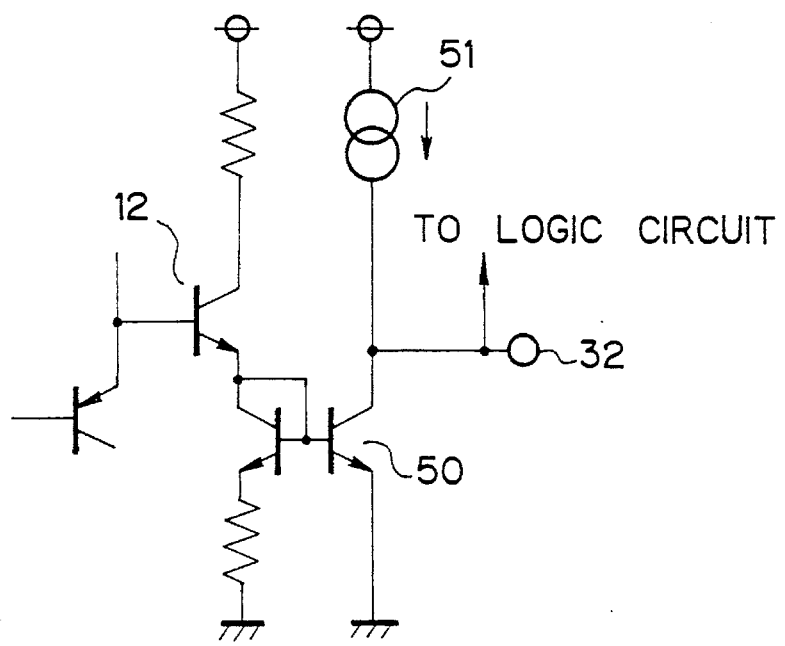
FIG. 7 is a circuit diagram according to a further embodiment of the present invention.

Described below is a third embodiment of the present invention. Referring to FIG. 7, a limitation is imposed on the current by connecting a transistor 50 in the output stage of the amplifier/input-output switching circuit 12 to a constant-current source 51, and a signal can be input through the terminal 32 at any timing without the need of switching the write/read mode by the mode signal 22a.

If three terminals are provided separately for feeding high voltages during the periods of feeding power source voltage, producing sensor output and effecting trimming, then the terminals for inputting the remaining signals can be suitably changed without being limited to those of the above-mentioned embodiments.

As described above, the semiconductor sensor device of the present invention has a decreased number of terminals, and is cheaply and compactly constructed permitting a trimming circuit to be provided on the chip.

We claim:

1. A semiconductor sensor device comprising:

a chip;

a semiconductor sensor contained in said chip;

a first terminal for inputting an operation voltage for said semiconductor sensor into said chip;

a second terminal coupled to an input-output switching means, for outputting a sensor signal from said semiconductor sensor out of said chip, and for inputting an external signal into said chip;

a third terminal for inputting a third terminal voltage into said chip;

auxiliary memory means for temporarily storing trimming data contained in a digital signal input through any one of said first, second or third terminals;

auxiliary measuring means for operating said semiconductor sensor at an operation voltage level based on said trimming data stored in said auxiliary memory means;

main memory means connected to said auxiliary measuring means, for storing trimming data;

trimming means for writing said trimming data stored in said auxiliary memory means into said main memory means; and main measuring means for operating said semiconductor sensor based on said trimming data stored in said main memory means, said main measuring means operable with a voltage level of said third terminal voltage.

2. A semiconductor sensor device comprising:

a chip;

a semiconductor sensor contained in said chip, said semiconductor sensor having an operation voltage;

a first terminal for inputting said operation voltage for said semiconductor sensor into said chip and for serially inputting a first digital data signal having a voltage level greater than said operation voltage;

a second terminal for outputting a sensor signal from said semiconductor sensor out of said chip and for serially inputting a second digital data signal into said chip;

a third terminal for inputting a third terminal voltage into said chip having a first voltage level, a second voltage level, and a third voltage level;

auxiliary memory means operable at said first voltage level of said third terminal voltage, for temporarily storing trimming data contained in one of said first and second digital data signals as parallel trimming data;

auxiliary measuring means for operating said semiconductor sensor at said first voltage level based on said trimming data stored in said auxiliary memory means;

main memory means connected to said auxiliary measuring means, for storing trimming data;

trimming means for writing said trimming data stored in said auxiliary memory means into said main memory means, said trimming means operable with said second voltage level of said third terminal voltage; and main measuring means for operating said semiconductor sensor based on said trimming data stored in said main memory means, said main measuring means operable with said third voltage level of said third terminal voltage.

3. A semiconductor sensor device comprising:

a semiconductor sensor;

a first terminal for serially receiving a digital signal;

auxiliary memory means receiving said digital signal, for temporarily storing information in said digital signal as parallel trimming data;

main memory means connected to said auxiliary memory means for permanently storing said parallel trimming data temporarily stored in said auxiliary memory means when a trim signal is applied to said device; and adjusting means for adjustably operating said semiconductor sensor based on said parallel trimming data.

4. A semiconductor sensor device according to claim 3, wherein said device further comprises trimming means for permanently storing said parallel trimming data temporarily stored in said auxiliary memory means into said main memory means.

5. A semiconductor sensor device according to claim 3, wherein said adjusting means comprises digital-to-analog conversion means for converting said trimming data to an analog signal.

6. A semiconductor sensor device according to claim 3, wherein said main memory means comprises an electrically programmable memory.

7. A semiconductor sensor device according to claim 3, wherein said auxiliary memory means includes a shift register.

8. A semiconductor sensor device according to claim 3, wherein said semiconductor sensor is a pressure sensor.

9. A semiconductor sensor device according to claim 3, further comprising control means for controlling a state of said device wherein:

in a trimmed state said control means controls said main memory to supply said trimming data stored in said main memory to said adjusting means, and in a trimming state said control means controls said auxiliary memory means to supply said trimming data temporarily stored in said auxiliary memory to said adjusting means.

10. A semiconductor sensor device according to claim 4, wherein said adjusting means further comprises:

an offset adjusting circuit adjusting an offset of said semiconductor sensor;

a temperature characteristic adjusting circuit adjusting a temperature characteristic of said semiconductor sensor; and a sensitivity adjusting circuit adjusting a sensitivity of said semiconductor sensor.

11. A semiconductor sensor device according to claim 4, wherein said main memory means includes an electrically programmable memory, said electrically programmable memory including fuse elements which are defused by said trimming means when a predetermined voltage level is applied to a second terminal of said device.

12. A semiconductor sensor device comprising:

a chip;

a semiconductor sensor contained in said chip;

a first terminal for inputting an operation voltage for said semiconductor sensor into said chip;

a second terminal coupled to an input-output switching means for outputting a sensor signal from said semiconductor sensor out of said chip;

a third terminal for inputting a third terminal voltage into said chip;

auxiliary memory means which starts operating at a voltage level from any one of said three terminals and for temporarily storing serial digital signal input thereto through any one of said three terminals as parallel trimming data;

auxiliary measuring means for operating said semiconductor sensor at said operating voltage level based on said trimming data stored in said auxiliary memory means;

main memory means connected to said auxiliary measuring means, for storing trimming data;

trimming means for writing said trimming data stored in said auxiliary memory means into said main memory means; and main measuring means for operating said semiconductor sensor based on said trimming data stored in said main memory means, said main measuring means operable with a voltage level of said third terminal voltage.

* * * * *